United States Patent [19]

Knirsch et al.

[11] 4,098,854
[45] Jul. 4, 1978

[54] COMBINED WET AND DRY LIQUID COOLING SYSTEM AND METHOD

[75] Inventors: Hermann Knirsch; Hans-Bernd Gerz, both of Wattenscheid, Fed. Rep. of Germany

[73] Assignee: GEA Luftkuhlergesellschaft Happel GmbH & Co. KG, Bochum, Fed. Rep. of Germany

[21] Appl. No.: 762,023

[22] Filed: Jan. 24, 1977

[30] Foreign Application Priority Data

Jan. 23, 1976 [DE] Fed. Rep. of Germany ....... 2602485

[51] Int. Cl.² .................................................. B01F 3/04
[52] U.S. Cl. ........................... 261/161; 165/DIG. 1; 261/23 R; 261/36 R; 261/151; 261/DIG. 11; 261/DIG. 77
[58] Field of Search .................. 261/29, 36 R, 76, 110, 261/158–161, DIG. 11, DIG. 77, 23 R, 111, 150; 165/DIG. 1, 60

[56] References Cited

U.S. PATENT DOCUMENTS

| | | | |
|---|---|---|---|
| 2,017,867 | 10/1935 | Nantz | 261/76 X |
| 3,596,888 | 8/1971 | Heller et al. | 261/36 R X |
| 3,635,042 | 1/1972 | Spangemacher | 261/150 X |
| 3,666,246 | 5/1972 | Cohen | 261/DIG. 77 |
| 3,782,451 | 1/1974 | Cates | 261/DIG. 11 |
| 3,831,667 | 8/1974 | Kilgore et al. | 261/DIG. 77 |
| 3,846,519 | 11/1974 | Spangemacher | 261/DIG. 77 |
| 3,865,911 | 2/1975 | Lefevre | 261/DIG. 11 |

*Primary Examiner*—Richard L. Chiesa
*Attorney, Agent, or Firm*—Michael J. Striker

[57] ABSTRACT

Liquid used in a liquid-heating machine such as a turbine condenser is continuously circulated in an endless fluid flow path which passes through the machine and which is subdivided at a location spaced from the machine into a pair of parallel branches. A closed dry-type heat exchanger is provided in one branch and a wet-type evaporative cooler is provided in the other branch. A fan or the like is operated to form a pair of parallel streams of air one of which is passed over the closed heat exchanger for cooling the liquid purely by conduction, and the other stream is passed directly over the liquid in the evaporative cooler so as to cool it largely evaporatively. The heated air coming off the dry-type heat exchanger is mixed with the heated humid air coming off the wet-type evaporative cooler and liberated to the atmosphere.

10 Claims, 1 Drawing Figure

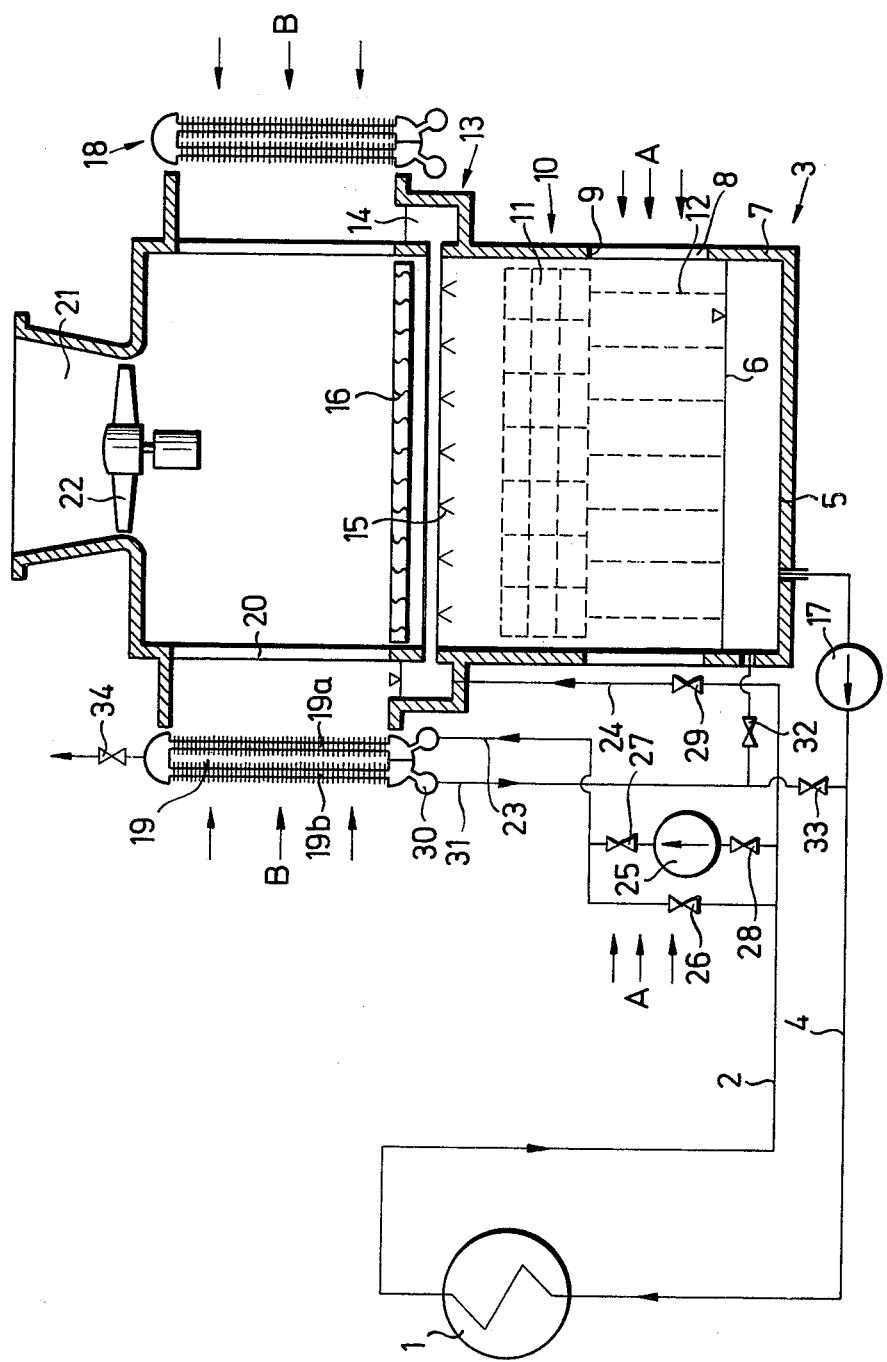

COMBINED WET AND DRY LIQUID COOLING SYSTEM AND METHOD

BACKGROUND OF THE INVENTION

The present invention relates to a method of and system for cooling a liquid. More particularly this invention concerns a system employed for cooling water passed through a liquid-heating machine such as a turbine condenser.

Two principal water cooling systems are known, the wet-type system and the dry-type system. In a dry cooler the liquid is cooled purely by heat transfer through a third material. Thus, for instance, water can be passed through a ribbed pipe over which air is circulated, so that heat exchange through the pipe is effected. In the wet-type system a gas is circulated directly in contact with the liquid so as to evaporate a portion of this liquid, thereby taking up the latent heat of evaporation and simultaneously conductively cooling the liquid.

The principal problem with the wet-type system is that the often saturated air used to evaporately cool the water condenses at least partially as it leaves the apparatus and, therefore, forms a large cloud that gives the appearance, although not the actuality, of air pollution. On the other hand the disadvantage of the dry-type system is that it is relatively inefficient so that a great deal of air must be moved over the heat exchanger in order to cool the liquid flowing through it.

It has been suggested to combine these two systems in order to reduce the overall humidity of the air released to the atmosphere. This has been done invariably by simply arranging a wet-type cooler in series relative to the direction of flow of the liquid through the system with a dry-type cooler. This is most simply done by providing in the upper region of an evaporative type cooling tower a plurality of ribbed tubes constituting a dry-type heat exchanger. Air streams are drawn in over each of these coolers and the heated air from the dry-type cooler is mixed with the heated and humidified air from the wet-type cooler and then released to the atmosphere. Thus the relative humidity is considerably decreased so that an objectionable cloud is not formed directly at the outlet of the system.

In such arrangements all the water issuing from the turbine condenser is first passed through the dry-type cooler, and then fed to the wet-type cooler. In the wet-type cooler the water is allowed to trickle down counter-current to a rising current of air and is then gathered in a basin beneath the wet-type cooler. From the basin the water is recirculated back to the turbine condenser.

The principal difficulty with such arrangements is that it is necessary to provide an extremely large dry-type heat exchange, so that original installation costs are very high. Furthermore, the operating efficiency is frequently considerably less than that which is ideally desired, so that the advantages on the one hand are often frequently completely outweighed by the disadvantages of such a combination system.

SUMMARY OF THE INVENTION

It is therefore an object of the present invention to provide an improved water cooling system and method.

Another object is to provide a system using a wet-type and a dry-type cooler which overcomes the above-given disadvantages of the known combination systems.

Yet another object is to provide such a system which cools the water being circulated to the desired temperature, yet which can be used with a cooling current of air whose humidity is not raised to the point where an objectionable vapor cloud is formed when the air is released into the atmosphere after passing over the coolers.

These objects are attained according to the present invention in a system of the above-described general type, but wherein the liquid is circulated from the output to the input of the liquid-heating machine through a path that is subdivided at one location into two parallel branches. The dry-type heat exchanger is provided in one branch and the wet-type cooler in the other branch, so that these two arrangements operate parallel to each other.

It has been found possible to adapt such a system to arrangements having an extremely large throughput of water, indeed volumes of greater than 100,000 $m^3/h$ can be handled with such a system easily. It has surprisingly been found that the amount of hot air that needs to be added to the saturated hot air issuing from the evaporative cooler in order to eliminate the above-mentioned vapor cloud is considerably smaller than that which is employed in conventional series-type installations. Thus it is only necessary in accordance with this invention to pass a portion of the hot water through the dry-type heat exchanger which, therefore, need not be built very large. In fact it has been found sufficient to pass only between 20 and 40% by volume of the water circulating through the dry-type cooler in order to achieve the desired results.

Yet another advantage is that the system can readily be adapted to existing wet-type coolers. Furthermore it is possible during a hot season to completely shut off the flow through the branch of the dry-type cooler, as the generation of an objectionable vapor cloud is much less likely when the outside or ambient temperature is high.

In accordance with yet another feature of this invention the downstream end of the branch of the circuit in which is provided the dry-type cooler is directly connected to the downstream end of the branch of the wet-type cooler. This can most easily be effected by terminating the conduit constituting the branch of the dry-type end below the water level in the bottom of the basin of the wet-type cooler. Such an arrangement considerably reduces the pumping head necessary to run the system.

According to yet another feature of this invention there is provided a pump in the branch of the dry-type cooler. This pump can be operated either as a simple priming pump that drives the liquid in this one branch up and through the closed dry-type cooler so that thereafter the system can run all by itself, siphon-fashion. Such a pump need not have a large capacity, as once the system is running it can be shut down and a shunt conduit extending across it can be opened up. A check or shut-off valve in parallel to this pump allows such priming operation. Another advantage of this system is that the circulating pump in the main-flow path need merely have sufficient capacity to operate the wet-type cooler, as the dry-type cooler will run itself as a siphon.

It is also possible in accordance with this invention to operate the pump in the branch of the dry-type cooler as a pressurizing pump. Thus this pump is run at a speed depending on the cooling needs of the system, and an appropriate control system connected to the turbine or turbine condenser may be also connected to the pump in this branch in order to control its operation within the necessary limits. Such an arrangement also makes it relatively easy to bleed the dry-type heat exchanger of all gas inside it in order that the system can operate siphon-fashion. Thus the possibility of the system corroding, freezing up, or becoming blocked is greatly reduced. In such an arrangement it is most efficient to provide the circulating pump in the branch of the wet-type cooler so that the downstream end of the branch of the dry-type cooler is connected to the pressure side of this circulating pump.

In accordance with further features of this invention the entire arrangement is provided on an upright cooling tower through which air is passed vertically. The wet-type cooler may be provided in the lower region of this tower, with lateral lower openings allowing for inflow of a first stream of air. Lateral openings in the upper region of the tower are aligned with the dry-type heat exchanger and the blower at the top of the tower draws air into the tower through both the upper and lower openings past the respective coolers. It is possible to operate the arrangement as a natural-draft tower, that is without a blower, as the heated air inside the tower will inherently rise therein and create the desired draft forming the two parallel streams of air passing through the respective heat exchangers.

Provision of various valves and connections as described above therefore makes it possible to operate the system in accordance with the requirements of the moment. When considerable cooling is required it is possible to operate both the circulating pump in the one branch and the pressurizing or priming pump in the other branch parallel to each other, or it is possible simply to operate the dry-type exchanger as a siphon. Furthermore, the output of the dry-type exchanger can be fed into the bottom of the wet-type exchanger or to the line between the output of the circulating pump and the input of the liquid-heating machine. The shunt conduit across the pump in the branch of the dry-type exchanger can be opened or closed, and valves in series with this priming or pressurizing pump can be closed if desired. It is even possible to provide a valve in the branch of the wet-type exchanger so that all of the liquid in the circuit can be forced series-fashion through both exchangers.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawing.

BRIEF DESCRIPTION OF THE DRAWING

The sole FIGURE of the drawing shows in largely diagrammatic form the system for carrying out the method according to the present invention.

SPECIFIC DESCRIPTION OF A PREFERRED EMBODIMENT

The system according to this invention is designed to operate with a water-cooled turbine steam condenser 1 whose output is connected via a line 2 to a cooling tower 3 and whose input is connected via a return line 4 to this tower 3. Hot water exits from the condenser 1 and is passed via the line 2 to the tower 3 and cooled water returns via the line 4 to the condenser 1.

According to this invention the tower 2 is upwardly elongated and of round section. It is formed at its floor as a basin 5 normally filled to a level 6 with water. The side walls 7 of the tower 3 are formed in the lower region of the tower 3 with laterally through-going openings 8 whose upper edges 9 lie level with a distributing arrangement 11 of a wet-type or evaporative cooler 10. Liquid is fed to this distributor 11 so as to trickle down along struts 12 by means of a feed arrangement 13. A channel 14 formed externally on the wall 7 communicates via tubing to nozzles 15 above the distributor 11 so that liquid inside this channel 14 can be sprayed down over the distributor 11 and allowed to trickle down the struts 12. A circulating pump 17 is provided in the return conduit 4 and withdraws water from the bottom of the basin 5.

Above the wet-type cooler 10 there is provided an impingement-type separator 16 which removes droplets from air rising within the tower 7. In addition a dry-type heat exchanger 18 comprising a ring 19 formed of an inner upright array 19a and an outer array 19b of tubes surrounds laterally through-going openings 20 formed in the upper region of the wall 7 of the tower 3.

At its upper end the tower 3 has an upwardly flared mouth 21 in which is provided a fan 22 that is operated so as to draw a first stream of air inwardly through the holes 8 as shown by arrows A and a second stream of air inwardly through the holes 20 as shown by the arrows B. In the upper region of the tower 3 above the separator 16 these two streams of air are mixed and blown upwardly, outwardly via the fan 22.

The path formed by the warm line 2 and the cool line 4 is interrupted and subdivided into two branches, a branch 23 passing through the dry-type cooler 18 and a branch 24 for the wet-type cooler 10. A priming or pressurizing pump 25 is provided in the branch 23 and can be shunted out by means of a closable valve 26. In addition isolating valves 27 and 28 are provided downstream and upstream of the pump 25. Water issuing from the outer manifold 30 of the dry-type cooler 18 descends in a portion 31 of the branch 23 and can be fed either through a valve 32 to the basin 5 below the level 6 or through a valve 33 to the line 4 between the condenser and the outlet of the pump 17. At its upper manifold between the inner and outer arrays 19a and 19b a bleed valve 34 is provided on the heat exchanger 18.

The branch 24 is provided with a valve 29 that allows it to be shut off altogether, and opens into the bottom of the channel 14 of the wet-type cooler 10. Thus this branch 24 in effect includes the cooler 10.

When the device is started up the fan 22 is first set into operation to draw in the two streams of air as shown at A and B. Simultaneously the pump 17 is operated so as to force water via the return or cool line 4 into the inlet of the tubine condenser 1 so that it is forced outwardly into the line 2 on the other side of this condenser 1. The valves 27 and 28 are open and the valve 26 is closed. At the same time both valves 32 and 33 are closed. The pump 25 is then operated to prime the entire heat exchanger 18. The valve 34 is left open and when liquid finally emerges from this valve 34 it is closed and the pump 25 is shut down. Thereupon the valves 27 and 28 are closed, and the valves 26 and 32 are opened for siphon-type flow through the heat exchanger 18. Such a siphon flow will be quite effective, as the pressure in line 2 will always be superatmospheric due to the inherent fluid friction in the system and to the fact that the pump 17 is operated at a rate so as to maintain the channel 14 full.

It is also possible to operate this system with the valve 26 closed and the valves 27 and 28 open. At the same time the valve 32 is closed and the valve 33 is open. The pump 25 can then be operated as a pressurizing pump so as to augment flow through the cooler 18. Such operation has no effect on circulation through the wet cooler 10.

Finally it is possible to cut the wet cooler 10 completely out of the system if desired, simply by closing the valve 29 as well as the valve 33. The valves 26 and 32 are left open so that the pump 17 will simply force all of the liquid through the dry heat exchanger 18, and will draw it in after it collects at the bottom of the basin 5.

With the arrangement according to this invention it is therefore possible to mix dry warm air with humid warm air in any desirable proportions so as to eliminate the objectionable formation of a vapor cloud at the mouth 21 of the tower 3. Not only does this eliminate the appearance of pollution, but it also ensures that the operation characteristics of the cooling system can be exactly tailored to the particular working conditions.

It will be understood that each of the elements described above, or two or more together, may also find a useful application in other types of systems differing from the types described above.

While the invention has been illustrated and described as embodied in a cooling system and method, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A system for cooling a liquid used in a liquid-heating machine, said system comprising:
    a conduit forming a fluid flow path passing through said machine and having a pair of ends;
    a pair of parallel branches interconnecting said ends and each having a respective upstream end portion connected to one of said ends of said path and a respective downstream end portion connected to the other of said ends of said path;
    pump means for circulating said liquid through said path and through said branches with a portion of said liquid passing through one of said branches and the remainder of said liquid passing through the other branch;
    a closed dry-type heat exchanger in said one branch between the respective upstream and downstream end portions thereof;
    a wet-type evaporative cooler in said other branch between the respective upstream and downstream end portions thereof;
    means for forming a pair of parallel streams of air;
    means for passing one of said air streams over said heat exchanger for cooling of the liquid therein by heat exchange through said exchanger; and
    means for passing the other of said air streams directly over said liquid in said evaporative cooler to directly contact said other air stream and said liquid in said other branch and thereby evaporatively cool said liquid in said other branch.

2. The system defined in claim 1 wherein said path includes a warm line connected between said machine and upstream end portions of said branches and a cool line connected between said machine and said downstream end portions of said branches.

3. The system defined in claim 2, further comprising a pump in said one branch, a shunt conduit connected to said one branch on either side of said pump, and a closable valve in said shunt conduit, whereby on closing of said valve and operation of said pump liquid is forced through said one branch.

4. The system defined in claim 3 wherein said evaporative cooler includes a basin and means for trickling said water in said other branch into said basin in contact with said other air stream.

5. The system defined in claim 4 wherein said other branch terminates below the liquid level in said basin and said basin constitutes part of said cool line.

6. The system defined in claim 1, further comprising a pressurizing pump in said one branch.

7. The system defined in claim 1 wherein said means for forming said air streams includes an upright draft tower.

8. A method of cooling a liquid used in a liquid-heating machine by circulation of said liquid in a path passing through said machine and through a closed dry-type heat exchanger and a wet-type evaporative cooler, said method comprising the steps of simultaneously and concomitantly:
    subdividing said endless path passing through said machine at a location spaced from said machine into a pair of parallel branches in one of which circulates a portion of said liquid and in the other of which circulates the balance of said liquid;
    continuously circulating said liquid in said path so that on each circuit of said path a portion of said liquid passes only through said one branch and the balance circulates only through said other branch;
    passing the liquid in said one branch through the interior of said closed dry-type heat exchanger
    passing the liquid in said other branch through said wet-type evaporative cooler;
    forming a pair of parallel air streams;
    passing one of said air streams over said heat exchanger to cool the liquid in said one branch by heat exchange through said heat exchanger only;
    passing the other of said air streams directly over said liquid in said other branch to directly contact and evaporatively cool same; and picking up humidity in said evaporative cooler from the liquid therein with said other air stream.

9. The method defined in claim 8, further comprising the step of combining said air streams after passing same over said heat exchanger and evaporative cooler and thereafter venting the combined air streams to the atmosphere.

10. The method defined in claim 9, further comprising the steps of trickling said liquid in said other branch into a basin while contacting said liquid in said other branch with said other air stream and feeding the liquid issuing from said heat-exchanger into said basin below the liquid level therein.

* * * * *